United States Patent
Racz et al.

(10) Patent No.: US 10,957,170 B2
(45) Date of Patent: Mar. 23, 2021

(54) NETWORK SANITIZATION FOR DEDICATED COMMUNICATION FUNCTION AND EDGE ENFORCEMENT

(71) Applicant: GENETEC INC., St-Laurent (CA)

(72) Inventors: Pierre Racz, Montreal (CA); Vincent Labrecque, Montreal (CA)

(73) Assignee: GENETEC INC., St-Laurent (CA)

( * ) Notice: Subject to any disclaimer, the term of this patent is extended or adjusted under 35 U.S.C. 154(b) by 241 days.

(21) Appl. No.: 16/068,195

(22) PCT Filed: Jan. 4, 2017

(86) PCT No.: PCT/CA2017/050003
§ 371 (c)(1),
(2) Date: Jul. 5, 2018

(87) PCT Pub. No.: WO2017/117670
PCT Pub. Date: Jul. 13, 2017

(65) Prior Publication Data
US 2019/0020658 A1     Jan. 17, 2019

Related U.S. Application Data

(60) Provisional application No. 62/275,846, filed on Jan. 7, 2016.

(51) Int. Cl.
*G06F 21/00* (2013.01)
*G08B 13/196* (2006.01)
(Continued)

(52) U.S. Cl.
CPC .......... *G08B 13/196* (2013.01); *G08B 25/08* (2013.01); *H04L 12/4625* (2013.01);
(Continued)

(58) Field of Classification Search
None
See application file for complete search history.

(56) References Cited

U.S. PATENT DOCUMENTS

| | | | |
|---|---|---|---|
| 7,509,687 B2 * | 3/2009 | Ofek | ...................... G06F 21/14 |
| | | | 709/227 |
| 8,250,235 B2 | 8/2012 | Harvey et al. | |

(Continued)

OTHER PUBLICATIONS

PCT/CA2017/050003 IPRP.
(Continued)

*Primary Examiner* — Maung T Lwin
(74) *Attorney, Agent, or Firm* — Anglehart et al.

(57) ABSTRACT

A network sanitization technology for enforcing a network edge and enforcing particular communication functions for untrusted dedicated-function devices such as Internet Protocol (IP) cameras. An untrusted network device is isolated from a network by a network sanitization system such that it cannot communicate with the network. Communications from the untrusted device are intercepted by the system and only allowed communications are used. Allowed communications are used to create new communications according to an allowed framework. Sanitization device may be in small two-port package with visual indicia indicating the untrusted device and the network side. The device may use and provide Power over Ethernet (PoE) to device. Abstract is not to be considered limiting.

28 Claims, 6 Drawing Sheets

(51) Int. Cl.
  *H04L 29/06* (2006.01)
  *G08B 25/08* (2006.01)
  *H04L 12/46* (2006.01)
  *H04W 12/08* (2021.01)

(52) U.S. Cl.
  CPC ...... *H04L 12/4666* (2013.01); *H04L 63/0245* (2013.01); *H04L 63/0254* (2013.01); *H04L 63/0876* (2013.01); *H04L 63/101* (2013.01); *H04L 63/105* (2013.01); *H04L 69/08* (2013.01); *H04W 12/0802* (2019.01); *H04L 63/20* (2013.01)

(56) References Cited

U.S. PATENT DOCUMENTS

| | | | |
|---|---|---|---|
| 8,649,883 B2* | 2/2014 | Lu | H04L 12/66 700/22 |
| 8,695,066 B1 | 4/2014 | Clark | |
| 8,954,725 B2 | 2/2015 | Singh et al. | |
| 2003/0097592 A1* | 5/2003 | Adusumilli | H04L 63/0853 726/4 |
| 2003/0169859 A1 | 9/2003 | Strathmeyer et al. | |
| 2003/0177382 A1* | 9/2003 | Ofek | H04L 47/283 726/14 |
| 2003/0177387 A1 | 9/2003 | Osterwalder et al. | |
| 2011/0296167 A1* | 12/2011 | Adusumilli | H04L 63/205 713/152 |
| 2012/0096145 A1 | 4/2012 | Le et al. | |
| 2013/0014263 A1* | 1/2013 | Porcello | H04L 63/0272 726/25 |
| 2013/0159699 A1* | 6/2013 | Torkkel | H04L 9/0897 713/155 |

OTHER PUBLICATIONS

PCT/CA2017/050003 ISR.
PCT/CA2017/050003 search strategy.
EP17735781.1 suppliementary European search report dated Apr. 5, 2019.
EP17735781.1 written opinion dated Apr. 5, 2019.

* cited by examiner

NETWORK SANITIZATION FOR DEDICATED COMMUNICATION FUNCTION AND EDGE ENFORCEMENT

CROSS-REFERENCE TO RELATED APPLICATIONS

This application claims priority to U.S. Provisional Patent Application No. 62/275,846 filed on Jan. 7, 2016, which is incorporated herein by reference in its entirety.

TECHNICAL FIELD

The subject matter disclosed relates generally to the field of communication security and more particularly to the field of communications with untrusted devices, e.g. on a sensitive network. The subject matter also relates to the field of surveillance networks and communication with untrusted Internet Protocol (IP) cameras.

BACKGROUND

This section is intended to provide the background for understanding the detailed description that follows. It is not intended to enlarge the scope of admitted prior art beyond what a skilled person would have beheld before reading the present description. While the background comprises prior art, it may also comprise the inventors' observations, discoveries, identification of heretofore unappreciated deficiencies or problems and insight into solving them. As such, this section may comprise description of inventive elements that is not prior art and that is not is admitted as such.

Modem security systems often employ IP cameras for surveillance. In this context, the term IP cameras is meant to encompass network-enabled cameras or more generally cameras that can provide video over a data network such as the Model M1014 from Axis Communications™. IP cameras may vary in sophistication, but are generally network elements in a particular network that have a certain level of access within that network. Their function may range from very basic video broadcasting to more complex functions such as two-way communication and network optimization. This opens the possibility for malware or clandestine functions to be incorporated within IP cameras to the detriment of and/or unbeknownst to the operator of the camera. IP cameras may also have analytics capabilities (e.g. to detect camera tampering, do object detection or detect line crossing or area penetration), perform motion detection, edge recording, software dewarping and control Pan-Tilt-Zoom (PTZ) angles.

FIG. 1 illustrates a typical surveillance system 100 in which a local area network (LAN) 105 comprises several routers 110 connecting various network elements in the LAN 105. For simplicity only some of the network elements and interconnections are illustrated; network architecture can vary. A set of IP cameras 115 are connected to the LAN 105 by connections to network elements within the LAN 105, in this example routers 110. As shown, the IP cameras 115 are network elements connected to the LAN 105 and may therefore be considered within the LAN 105. A typical surveillance system may include at least one surveillance server 120 which performs surveillance functions such as managing storage and display of camera feeds.

A typical surveillance system may also include one or more storage repository for storing camera feeds such as a local storage repository 125 accessed directly by the surveillance server 120. A surveillance system may also include a networked storage repository 130 for storing and accessing surveillance data over the LAN 105. A surveillance system may also employ cloud-based storage using a cloud-based storage repository 135 for storing data over the internet.

A typical LAN 105 will have at least one external connection 145 to connect to an external network 150 such as the internet.

Typically a surveillance network such as the LAN 105 is a private network and steps are taken to protect the network from intrusions from external sources, e.g. over connection 145. The surveillance data which may be stored in the LAN 105 may be extremely sensitive and its integrity and confidentiality is typically important for security. Moreover, a network that serves as a surveillance network like the LAN 105 may also serve for other purposes an may include various servers 140 and workstations 155 which must not be compromised.

SUMMARY

The inventors have recognized a risk and a need to protect a sensitive network from network equipment such as IP cameras 115.

Currently the principle focus of network security has been guarding against external attacks; however the inventors have discovered a risk of network compromise stemming from IP cameras 115 and other dedicated-function hardware itself. Being connected directly into the surveillance network, an IP camera 115 may be provided with malicious functionality intended to violate the surveillance network. Violations of the surveillance network may include accumulating sensitive information from the network, transmitting sensitive information (either obtained from the network or captured by the camera 115) to a third party, e.g. over the internet, or sabotaging the network. Besides deliberate malicious function, a poorly designed IP camera 115 may contain bugs that can negatively impact the security and integrity LAN 105.

In one example, a malicious or dysfunctional IP camera may create a denial of service attack by flooding the network (and particularly the server) with packets to process or by taking advantage of a security breach in the server's software, e.g. by using Structured Query Language (SQL) queries containing malicious code that are not handled properly by the server.

In another example, an IP camera 115 may be performing a function that is not recognized as necessarily malicious but is not considered "safe" or within the desired functions of the IP camera 115. These can be functions that are not justified by the camera's intended functionality or that are not compatible with a customer's threat model. A compromised IP camera 115 may perform hostile functions such as leaking network topology, service deployment, leaking utilization patterns, etc. These may be threats that are not justified according to intended functionality and customer threat model. It would be useful within a security assessment to be able confirm that an IP camera 115's only attack vector would be to produce incorrect video or audio data.

However, in standard security networks, however, an IP camera 115 may undertake a range of functions not deemed "safe" from a network safety/integrity standpoint and/or not justified by its functionality as a security camera. For example, there may be illicit functions such as port scans, which can be as simple as attempting to connect to every port, but which can also be made stealthier by not completing the connection can be used to report what ports are open and even to identify the operating systems deployed on computers on the network by sending ill-formed packets and analyzing the Operating System (OS) response to undocumented packets. Such tactics are not easily countered by standard protocols. Other functions, such as network discovery may also be inappropriate for an IP camera 115 or other network elements. Domain Name System (DNS) lookups may also be a source of information leak, as employee names, hiring patterns and organizational structure may be inferred from server names, and also traffic analysis (e.g. noticing that a department is not using an internal server and therefore must be using an external one). Many network functions which pose a potential threat may or may not be for malicious intent and may also be not required for the desired functionality of the IP camera 115, if one merely wants the IP camera to provide video feed. Many other potentially threatening network activity exist that is not required for achieving the desired functionality of the IP camera 115 (namely, for example, to record and transmit specific types of data such as video and audio).

One solution to minimize this risk would be to strictly operate equipment that is trusted. Equipment may be made trusted by a variety of ways, for example by being produced in-house (not a solution available to most purchasers of IP cameras), by having a transparent architecture that is open to scrutiny by the buyer (e.g. open source), or by being produced by a manufacturer that is trusted. None of these generally offer full guarantees of the safety of the equipment. It is a very onerous task to generate or examine program code and bugs and errors cannot typically be avoided with 100% certainty. And even a trusted producer can only be trusted as far as it has control over its employees and its own internal security. Practically speaking, a risk-reduction approach is to simply avoid buy IP cameras or like equipment from countries with poor network safety records and to purchase from well-reputed domestic companies. But even this does not guarantee the safety of the equipment. Ideally, one may want to leverage analysis/trust from as few verifications as possible; with the network sanitizing solution provided herein, verification and assessment of trust can be achieved for a wide array of different devices (e.g. a large number of IP cameras) by verification of few (e.g. a single) sanitization device.

Moreover, equipment from reputable domestic companies tends to be much more expensive than cheaper foreign-made alternatives. Many IP cameras or other dedicated-functionality equipment can be procured much cheaper from untrusted sources. In one embodiment is provided technology that allows risk reduction which makes it possible and reasonable to use untrusted devices on a sensitive network while protecting the network.

Although the invention is described here with reference to IP cameras 115, it will be appreciated that other networked equipment can likewise be introducing a risk to the network into which they are being connected. Printers, IP phones and other networked equipment may likewise be provided maliciously or unintentionally with unwanted functionality. This unwanted functionality may include harmful functionality, such as the malicious functions described above, or merely functionality that goes beyond the dedicated function of the networked equipment intended by the owner or operator.

Connected devices aiming to provide a more intelligent home environment such as intelligent thermostats, smoke detectors, etc. often use access to private local area networks, such as a home network, and are often located within private settings, such as homes. Such devices may be programmed to perform network discovery and/or monitoring and to send reports on network topology, activity, or other private data to a company server over the internet. Such devices may also be programmed to sniff out Media Access Control (MAC) addresses, for example, of devices connected to the network and to provide these to a server, e.g. belonging to the manufacturing company, in order to populate a connection database. This way, a company that may already have mobile phone MAC addresses from, for example, providing app-based services (e.g. social networking apps or the like), may gather data indicating which of their users have been in the same networks (or homes) as others of their users. This may allow discovery, for example, of who lives with whom and who is likely friends or colleagues with whom. Such information might not necessarily be used for nefarious purposes but it may be considered a violation of privacy by some users.

Dedicated-function devices, like IP cameras, smart TV, an IP phone or an intelligent thermostat, differ from general-purpose devices, like computers and smartphones, because they have a predetermined set of functions for which they need to communicate over the network. As such we can limit their communications over a sensitive network to a particular range of types of communications which we want and expect the device to undertake. Outside of those allowed communications, there may be certain types of communications which we know to be unsafe and which we don't want the device to undertake on the network. These may include any of the harmful communications described herein or others. A dedicated-function device may also attempt to transmit communications which appear to be benign but which cannot be ascribed to a desired function for the device. These types of communications, since they are not required for the desired functions of the device can be prevented from entering the local network, and either be simply dropped or responded to (e.g. with a denial or a generic response) by the network sanitization system described herein. Unknown communications which are not understood by the network sanitization system may likewise be dropped/denied.

With a general purpose device, such as a computer or smartphone, it is generally not possible to enforce a certain functionality, particularly at the application level, since the device needs to support varied, unpredictable and ever-changing functions. Thus guarding against general-purpose devices misbehaving on a network generally requires firewalls or other best-effort solutions.

But when a piece of networked equipment, be it an IP camera 115 or another piece of equipment has a dedicated or desired functionality, it has been found to be useful and possible to sanitize the traffic output by the device to ensure that no undesired functionality is undertaken by the device or more particularly to enforce a particular limit to the network activity of the device. The network sanitization described herein ensure not only that only acceptable communications enter a protected network, but also that communications conform with particular safe protocol and parameters desired.

Optionally, the sanitization may be bidirectional. That is to say that data being provided to the piece of networked equipment from the network may also be sanitized as is done from data exiting the piece of networked equipment onto the network, to ensure that no unnecessary or undesired communications are provided to the device by any other device on the network that do not match the device's desired functionality. In order to prevent hostile devices already present on the network from providing an IP camera 115 or other device with communications that do not conform with particular safe protocols and parameters or that are not pertinent to the device's intended function, network sanitization of the same kind as is performed in the downstream direction (from device to network) may also be performed in the upstream direction.

In accordance with certain broad embodiments, is also provided the subject matter of the claims.

In accordance with a certain broad embodiment is provided a network sanitizer for isolating an untrusted device from a sensitive network and for enforcing authorized transmissions on the sensitive network. The network sanitizer comprises: an isolated network interface for connecting to an untrusted device, said isolated network interface being isolated from the sensitive network; a sensitive network interface for connecting to the sensitive network; and a processor located logically between the isolated network interface and the sensitive network interface adapted to receive data packets from the isolated network interface. The processor is configured to: intercept every communication originating from the untrusted device and for every intercepted communication: evaluate the communication to ascertain if the communication is an allowed transmission; if the communication is an allowed transmission, generate a recreated communication using an allowed framework satisfying at least in part a purpose of the allowed transmission; and transmit the recreated communication the over the sensitive network using the sensitive network interface, wherein the intercepted communication is not, itself, transmitted over the sensitive network.

In accordance with another broad embodiment is provided a network edge enforcement device for creating an enforced edge of a sensitive network and limiting access to the sensitive network from beyond the edge comprising: a sensitive network interface for connecting to, and communicating over, the sensitive network; an external access interface for connecting to an untrusted device outside of the sensitive network; and a processor in communication with both the external access interface and the sensitive network interface and having a programmed protocol, the processor being configured for emulating the functionality of the untrusted device by generating safe communications using the programmed protocol, a set of trusted parameters, and data obtained the untrusted device over the external access interface and transmitting the safe communications onto the sensitive network over the sensitive network interface.

In accordance with another broad embodiment is provided a network edge enforcement device for creating an enforced edge of a sensitive network and limiting access to the sensitive network from beyond the edge comprising: an external access interface for connecting to an untrusted device outside of the sensitive network; a sensitive network interface for connecting to, and communicating over, the sensitive network; a processor in communication with both the external access interface and the sensitive network interface. The processor is configured to: establish over the sensitive network interface a connection with a network sanitization server; and intercept every communication originating from the untrusted device and re-route them to the sanitization server to be sanitized.

In accordance with another broad embodiment is provided a network sanitization device for protecting a sensitive network from an untrusted dedicated-function device, the network sanitization device comprising: a rigid enclosed body having no display or user input interface; an isolated network interface for connecting to the untrusted dedicated-function device comprising a first physical network connector; and a sensitive network interface for connecting to the sensitive network comprising a second physical network connector; and processing logic tangibly contained within the rigid enclosed body and in communication with the isolated network interface and the sensitive network interface, configured for implementing network sanitization to prevent unwanted communications from the untrusted dedicated-function device from harming the sensitive network.

In accordance with another broad embodiment is provided a network sanitization device for protecting a sensitive network from an untrusted dedicated-function device. The network sanitization device comprises an isolated network interface for connecting to the untrusted dedicated-function device comprising: a first physical network connector for connecting to a first network cable in communication with the untrusted dedicated-function device; a first data transfer circuit for transferring data to and from the first network cable; and a power output circuit for injecting a power into the first network cable for powering the untrusted dedicated-function device. The network sanitization device also comprises a sensitive network interface for connecting to the sensitive network comprising: a second physical network connector for connecting to a second network cable from the sensitive network; a second data transfer circuit for transferring data to and from the second network cable; and a power input circuit for extracting power from the second network cable for powering the network sanitization device. The network sanitization device also comprises processing logic powered by the power extracted from the second network cable, the processing logic being in communication with the isolated network interface and the sensitive network interface, configured for implementing network sanitization to prevent unwanted communications from the untrusted dedicated-function device from harming the sensitive network; and a power distribution circuit for distributing power extracted from the second network cable by the power input circuit to the processing logic and to the power output circuit.

In accordance with another broad aspect is provided a network sanitization device for protecting a sensitive network from an untrusted dedicated-function device, the network sanitization device comprising: an isolated network interface for connecting to the untrusted dedicated-function device; a sensitive network interface for connecting to the sensitive network; and processing logic in communication with the isolated network interface and the sensitive network interface, configured for implementing network sanitization to prevent unwanted communications from the untrusted dedicated-function device from harming the sensitive network, wherein the processing logic is further configured to detect an unauthorized communication from the untrusted dedicated-function device and to generate a report indicative of the unauthorized communication.

BRIEF DESCRIPTION OF THE DRAWINGS

The invention will be better understood by way of the following detailed description of embodiments of the invention with reference to the appended drawings, in which:

FIG. 4b shows a rear-left perspective view of the network sanitization device of FIG. 4a;

DETAILED DESCRIPTION

With the flood of inexpensive IP Cameras and other IP Devices coming from untrustworthy equipment manufacturers, budget constrained organizations are increasingly willing to ignore the security threat when making their purchasing decisions.

The equipment may be untrustworthy because of the lack of technical expertise on the manufacture's part to implement proper security, because the device is easy to compromise and has weak security, or because it comes from countries with a vested interest in inserting malicious behavior in equipment they export, for example.

Proposed is a network sanitization technology that mitigates that security threat by inserting a network sanitization device between a dedicated-function untrusted device and the network. In one example the network sanitization device may be a small, inexpensive, Ethernet powered device inserted inline between the untrusted device and a sensitive network, comprising a microprocessor and two Ethernet ports. An upstream Ethernet port connects to the untrusted device and optionally powers the untrusted device and a downstream Ethernet port connects to the network. The downstream port can connect to either a closed, trusted and secured network, or to a public network.

Figure 3A:
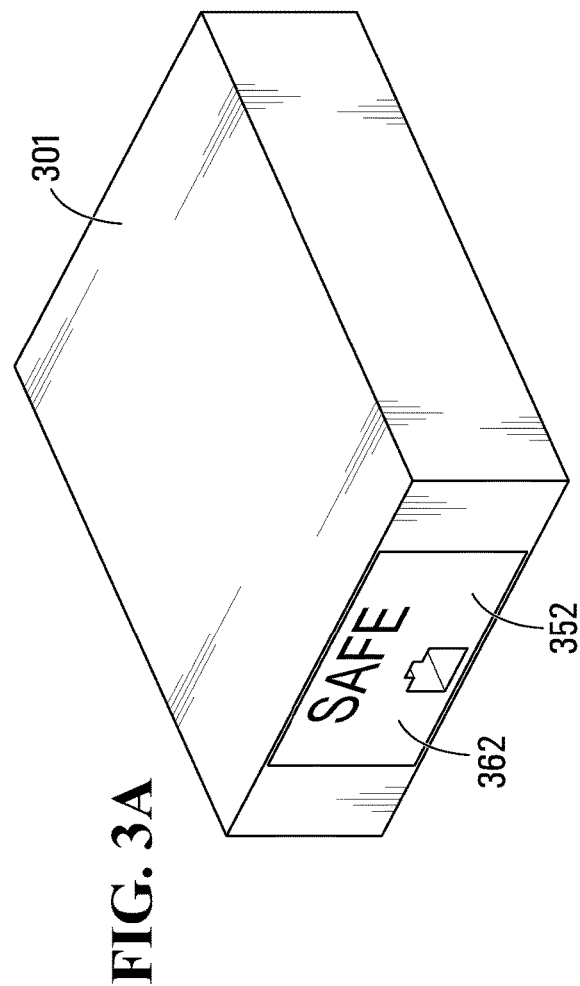
FIG. 3a shows a front-left perspective view of a network sanitization device in accordance with a non-limiting example.
Figure 3B:
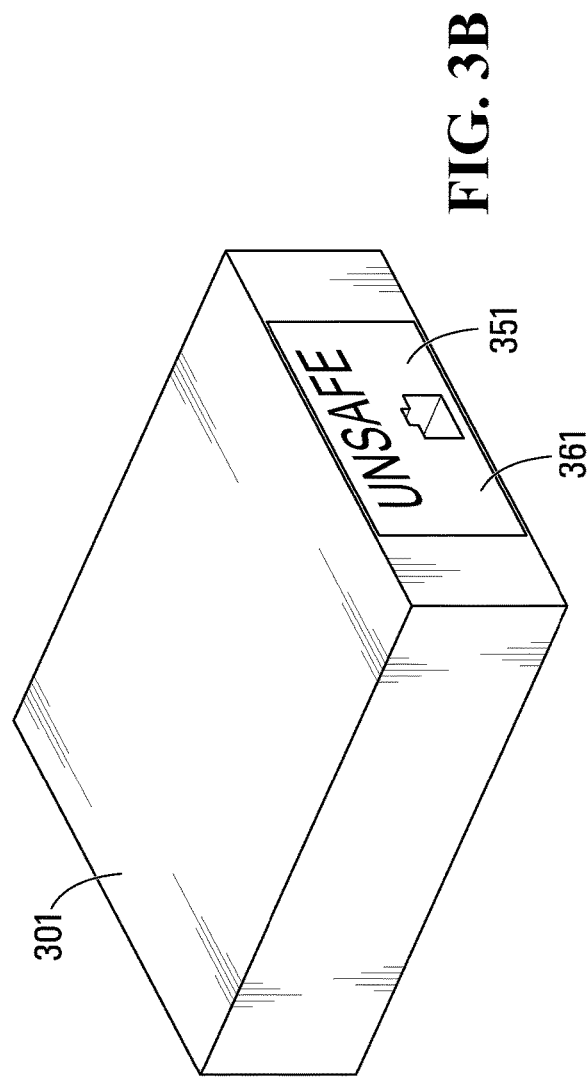
FIG. 3b shows a front-right perspective view of the network sanitization device of FIG. 3A.

FIG. 3a and FIG. 3b shows an exemplary network sanitization device 301 from front-left and front-right perspective views, respectively, according to a particular example. In this particular example, the network sanitization device 301 is a physical security protocol aware network scrubber which processes only communications which it understands. These it processes by thoroughly sanitizing/rewriting/reinterpreting traffic to satisfy the request without passing through any data as-is. Thus only implicit and accepted threats for the specific device are allowed, such as producing arbitrary pixels in a video stream to communicate data. Unlike a firewall, the network sanitization device operates at the application level for instance rewriting NTP requests that the untrusted device may do to synchronize its clock.

The network sanitization device 301 may be used to establish a secure and trusted reverse-tunnel to a trusted server, which may be a cloud based server. Advantageously, for surveillance networks (or other systems) where a surveillance server (or other server type) uses reverse-tunneling for secure communication with the camera (or other dedicated-function device), the network sanitization device 301 may be used to implement such communication for devices (e.g. IP cameras) that are not capable of implementing the reverse tunnel protocol itself. Moreover it may it further isolates the cloud based server from the untrusted device going rogue.

In one example, a reverse tunnel may be a secure (encrypted) tunnel between a client and a server. The tunnel is established by the client contacting the server. Once established the server establishes command-and-control-protocol channel through the tunnel to the client. Because the tunnel is established by the client, the tunnel can be established without having to open network ports in any downstream corporate firewall.

In a particular example, the network sanitization device 301 is configured to be connected between an untrusted device and a network. It intercepts all requests that the untrusted device might make of the network such as for Network Time Services (NTP), Domain Name Resolution (DNS), Network Address Resolution (ARP), etc., and may provide a sand-boxed response to the untrusted device (UTD).

For example, the network sanitization device 301 may prevent a rogue device from performing a network scan in order to discover other devices on the network or on the internet. Network scans are often a prelude to malware propagation.

Moreover, the network sanitization device 301 may detect rogue untrusted devices and attempts at subverting the network and may gather evidence of the rogue behavior of the untrusted device.

In one example, network sanitization device 301 establishes an application level session with the untrusted device and re-encapsulates the data collected by the untrusted device. This re-encapsulated data is encrypted and signed before being sent downstream. This ensures the privacy of the information collected by the untrusted device as well as authenticating the origin of the device-collected-data to the network in order to prevent unauthorized devices to be connected to the network. This mitigates man-in-the-middle attacks.

The network sanitization device 301 prevents any back-door connections to the untrusted device and prevents the untrusted device from "Phoning Home".

In certain examples, the network sanitization device 301 intercepts all communications from the untrusted device at the application layer verifies them against a list of allowed communications, and if found to be in the list of allowed communications, re-writes the communication according to a particular safe protocol and safe parameters. The network sanitization device 301 may also adapt the communications at lower levels, for example in one example, the network sanitization device is used to adapt untrusted devices that are limited to IPv4 protocols to an IPv6 network, e.g. by transmitting the re-created communications using IPv6 packets. In intercepting all the communications from the untrusted device, the network sanitization device 301 in this case receives every single packet output by the untrusted device and does not pass-through (i.e. pass on without further consideration) a single one of them but rather either drops it, processes it internally, and/or uses it to create a new communication that will be transmitted over the network.

The network sanitization device 301 may be used to provide augmented functionality such as to implement application level stream transformations to the data collected from the untrusted device such as providing a low bandwidth thumb-nail stream extracted from a full frame data stream gathered from the untrusted device.

Besides network security, the network sanitization device 301 may enforce other network policies and constraints, and may perform optimization functions for the network. For example, the network sanitization device 301 may be used to intercept chatty protocols (such as Open Network Video Interface Forum (ONVIF) that may be used by an untrusted device and replace them with more efficient and bandwidth respectful protocols, thus enhancing the performance of the untrusted device and reducing round trip lag of chatty protocols (for example ONVIF PTZ).

In one example, the network sanitization device 301 incorporates a Trusted Platform Module (TPM) to ensure that its binaries have not been tampered or compromised.

For the purpose of the description, we will mostly describe the invention using the example of untrusted IP cameras. However, it will be appreciated that sanitization of communications from other dedicated-function devices can likewise be performed as taught herein. Likewise the examples provided herein generally comprise a sensitive network in the form of a LAN with sensitive equipment, however it will be understood that this technology may be used with any network, sensitive or not, and that a network can be sensitive for any number of reasons including for the reason that it gives access to an untrusted device to contact third party servers.

Figure 1:
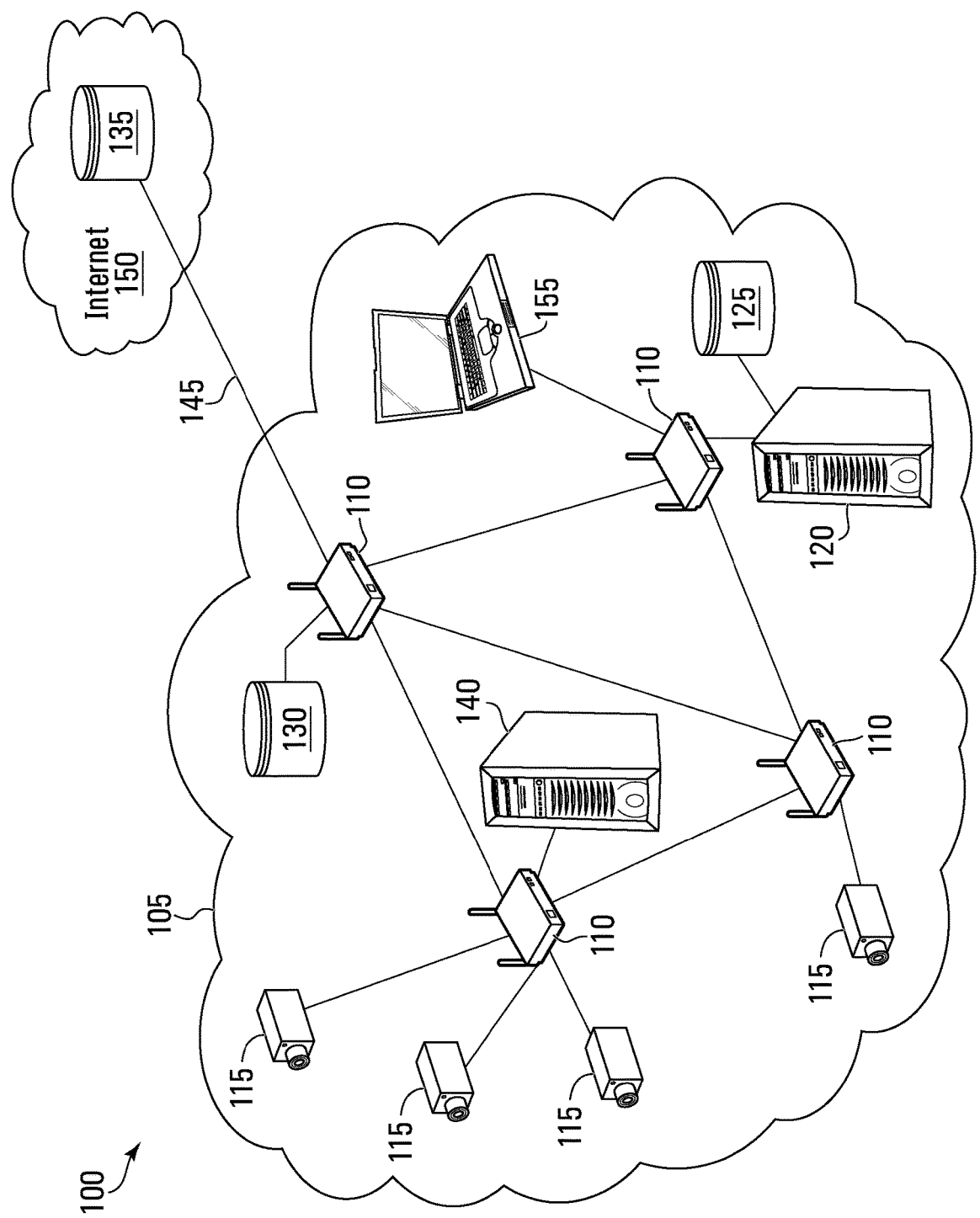
FIG. 1 illustrates a typical surveillance system 100 in accordance with the prior art.
Figure 2:
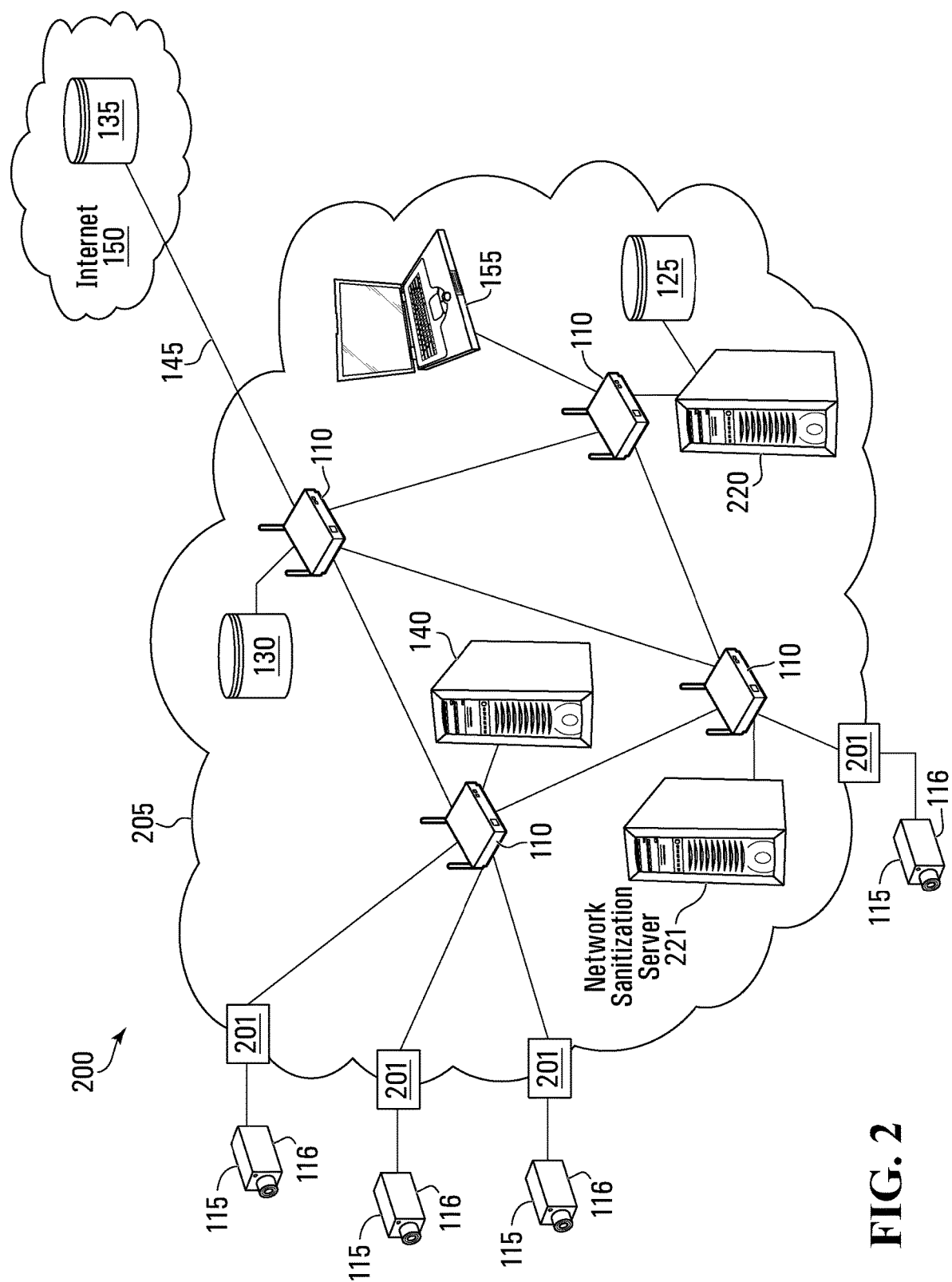
FIG. 2 illustrates a surveillance system comprising a sensitive network and a plurality of untrusted devices isolated by respective network sanitization devices.

The network sanitization device 301 may be used to enforce a separation between one or more untrusted device and a network, such as a sensitive network like the LAN 105. Turning to FIG. 2, a surveillance system 200 comprises a plurality of untrusted devices 116 that are dedicated-function devices and more particularly in this example, IP cameras 115, and a network 205, which in this case serves as a surveillance network and which in this example is a local area network. The network 205 may comprise a plurality of sub-networks and any number of network elements including routers 110, workstations 155, various servers 140, interfaces to other networks such as an external connection to the internet 145. In this example, the network comprises a surveillance server 220 having local storage repository 125, a networked storage repository 130 and a cloud-based storage repository 135. The network 205 may also comprise a network sanitization server 221 in certain embodiments.

The network 200 is protected by a plurality of network sanitization devices 201 like the network sanitization device 301, which may enforce a network edge before the IP cameras 115. The network sanitization devices 201 create a separation between the network 205 and the untrusted devices 115

Besides cameras, other surveillance equipment such as microphones, door sensors, motion detectors, door controllers, etc. that are dedicated-function devices may be used in the surveillance system 200.

Figure 3C:
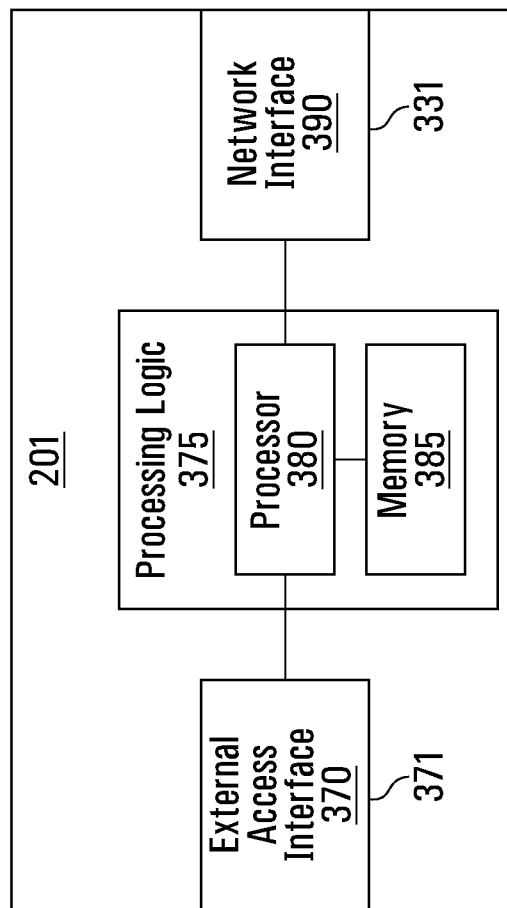
FIG. 3c shows a block diagram of the network sanitization device of FIG. 2.

FIG. 3c is a block diagram of an exemplary network sanitization device 201. In a non-limiting example, the network sanitization device 201 is a network edge enforcement device. It creates and enforces an edge to the network 205 such that untrusted devices 116 connected such as to limit access to the sensitive network from beyond the edge. The network sanitization devices 201 form an edge of the network 205 and can themselves communicate over the network 205. For this they have a network interface 390 which can connect to the network and through which the network sanitization devices 201 can communicating over the network 205.

The network sanitization devices 201 also have an external access interface 370 for connecting to devices that are not within the network 205. In particular, the external access interface 370 may be for connecting to untrusted devices and more particularly to untrusted dedicated-function devices such as IP camera 115. An external device such as an untrusted device 116, though connected to the network sanitization device 201 is not, in this example, in direct contact with the network 205 as it cannot communicate directly over the network 205 to any device connected thereon. Indeed in this example none of the communications from the untrusted device 116 may output to the network sanitization device 201 are passed through to the network 205.

The network sanitization device 201 may emulate a connection to the network for the untrusted device 116 connected at the external access interface 370 such that the untrusted device may communicate with the network sanitization device 201 as if it were connected to the network 205. To this end, the network sanitization device 201 may provide to the untrusted device 116 communications (e.g. Dynamic Host Configuration Protocol (DHCP) answers to assign it an IP and other network settings) as would be expected if the untrusted devices 116 were indeed connected to the network 205.

The network sanitization device 201 of this example comprises processing logic 375 that is configured to perform certain functions. The processing logic 375 may comprise a processing entity 380 such as a Central Processing Unit (CPU) that may be a general-purpose processor configured to execute program code. The processing logic 375 may comprise computer readable memory 385 accessible by the processor 380 and comprising program code for causing the processor 380 to perform the function described herein as is programmable by a skilled programmer. Thus the processing logic 375 and processor 380 may be configured, e.g. by program code, to perform the functions described herein. This may include program code for causing the processor 380 to interact with interfaces, for example the network interface 390 or the external access interface 370 to obtain therefrom communications (in particular to receive therefrom data packets, for example, which may be application level packets) and to read these communications as well as to provide thereto communications, e.g. for transmission by the network interface 390 or external access interface 370. The program code may also comprise instructions for causing the processor 380 to read, process, modify and analyze communications, as well as to create new communications. The computer readable memory 385 may be distributed and may comprise various levels of cache as well as random-access components, read-only components and other forms of storage. The computer-readable memory 385 may store data other than the program code, for example protocols, parameters, translation tables, and/or black lists as further described herein. A skilled programmer of Application-Specific Integrated Circuits (ASICs) and Field Programmable Gate Array (FPGA) might replicate functionality and configure the processing logic 375 in hardware in its entirety, or in part (e.g. for the most processing-intensive components), although for a number of reasons the software implementation is used here.

In this particular example, the network sanitization device 201 comprises processing logic 375, including a processor 380 that is in communication with both the external access interface 370 and the network interface 390. The processing logic 375 comprises a programmed protocol that is a safe protocol represents acceptable communications that can be safely transmitted over the network. The processing logic 375 may have safe or trusted parameters for communications, such as destination addresses for certain types of communications to ensure that sensitive communications are directed to the appropriate location, for example, or to ensure that sensitive portions of the network are not accessed if not appropriate. The destination address may be a location within the network 205, for a network address for the surveillance server 220. The processor 380 is configured for emulating the functionality of the untrusted device by generating safe communications using the programmed protocol, a set of trusted parameters, and data obtained from the untrusted device over the external access interface 370 and transmitting the safe communications onto the network 205 over the network interface 390.

In the present example, the external access interface 370 is a type of network interface and in this particular case comprises an Ethernet interface, for communicating with an IP camera 115 using networking protocols. The network interface 390 may a sensitive network interface 391 whereby it is for connecting to a sensitive network (e.g. LAN) such as network 205. The external interface 370 may be an isolated network interface 371 that is isolated from the network 205. The processing logic 375 is located in this example logically between the isolated network interface 371 and the sensitive network interface 391. Although the isolated network interface 371 is in communication with the processing logic 375 that is in communication with the sensitive network interface 391 that may be connected to the network 205, the isolated network interface 371 is isolated from the network 205 and has no direct access thereto and is further prevented from communicating over the network 205 by the processing logic 375 which implements a separation between the isolated network interface 371 and the sensitive network interface 391.

In the present example, the untrusted device is an IP camera 115 which is configured to broadcast video data over a network, but the network sanitization device 201 intercepts the data and ensures only self-generated safe communications are transmitted over the network 205. Thus the network sanitization device 201 may be a network sanitizer that isolates an untrusted device from a sensitive network and enforces authorized transmissions on the sensitive network. The processing logic 375 and processor 380 is in this example configured to intercept every communication originating from the untrusted device. In particular it may ignore or drop some communications but it does not pass them through as-is, they are all intercepted and prevented from flowing into the network 205.

In this example, the processor 380 is configured to for every intercepted communication 1) evaluate the communication to ascertain if the communication is an allowed transmission, 2) if the communication is an allowed transmission, generate a recreated communication using an allowed framework satisfying at least in part a purpose of the allowed transmission; and 3) transmit the recreated communication the over the sensitive network using the sensitive network interface, wherein the intercepted communication is not, itself, transmitted over the sensitive network.

Evaluation of the communication may vary in complexity. If it is specific enough, evaluation may be rather cursory. In one example it may be as simple as simply attempting to re-write the communication by looking up the received communication in a concordance table (linking types of received communication with acceptable communication formats according to a safe programmed protocol) and if that fails (e.g. because it can't be recognized/found) then it is considered to be evaluated as a forbidden communication.

Evaluation may serve to determine the purpose of the communication. In one embodiment, evaluation of the communication may comprise attempting to determine the purpose of the communication. The network sanitization device 201 may comprise a translation table dictating how communications are to be generated according to an allowed format and allowed parameters. Each entry of the translation table may comprise a template for creating a new communication in an allowed format. In this example, the entries also comprises concordance data used to determine what incoming message types to be re-written using the entry's template although other schemes may be used. The concordance data of this example include one or more message type identifiers such as an Real-Time Transport Protocol (RTP) packet type such that the network sanitization device 201, upon receiving an RTP packet, can compare this type of packet to the concordance data in the translation table to find the template to use to re-write the packet. Communications received from the IP camera 115 are compared against the translation table to identify the correct entry describing an allowed communication message which is then created, as dictated by template in the translation table. In the present example, RTP traffic is identified by its port number within the Transmission Control Protocol (TCP), or more commonly, User Datagram Protocol (UDP) packet header (e.g. the first 4 bytes of the IP payload, if the IP protocol is UDP).

The translation table thus comprises a list of communications which are to be re-created by the network sanitization device 201 for transmission in the network 205, or which more broadly may be communications which warrant the creation of a communication for transmission over the network 205. The translation table may thus define the allowed framework and the entries therein may each correspond to an allowed sanitized communication, including for example a particular communication message (in this case a type of application-level packet) to create. As part of the concordance data, the translation list may include parameters on how to create (including, for example, how to use the data from the received communication and other parameters such as a destination address). A new communication for transmission over the network is then created under the allowed framework, in this example the new communication is a re-creation of the received communication, and it serves generally the same purpose (e.g. transmission of video data) but in an approved manner. In one example, RTP packets from an IP camera 115 are re-created by the network sanitization device 201 and sent to the surveillance server 220 (regardless of the destination in the original packet from the IP camera 115), but other packets are not and are dropped. The example can be expanded to treat other packet types. For example RTSP traffic carrying requests from a client to the IP camera 115 may be monitored and optionally re-written for symmetric sanitization to keep track of "play" commands requesting video, only routing RTP video traffic from the device in response to such a command.

In the present example, communications received from the IP camera 115 at the network sanitization device 201 for which a corresponding entry cannot be found in the translation table are simply ignored, preventing the dissemination of uncontrolled messages onto the network 105. This powerful system ensures no weakness results from an out-of-date network sanitization device 201.

To this end, the network sanitization device may have a computer-readable memory, such as memory 385 storing the translation table, e.g. as a look-up table for looking up received application-level communication (or, in this particular, case, portions thereof (e.g. headers) and retrieve the template according to the allowed framework or information allowing the processing logic 375 to generate the new communication under the allowed framework.

In a variant implementation, the network sanitization device 201 may be configured to generate its own communications for transmission over the network 205 for its own purposes as a network element. In one particular variant embodiment, the network sanitization device 201 may provide portions (such as IP endpoints, statistics regarding the communication, or wrapped complete packets) of a communication received from a trusted device (e.g. safely encapsulated as a payload in a communication created according to a safe framework), to a server, e.g. to the network sanitization server 221 which performs the evaluation for the network sanitization device 201 and provides in return instructions to the network sanitization device 201 on how to handle the received communication. In particular, the network sanitization server may comprise a translation table as described and/or may perform other evaluations such as evaluating the timing of the communications sent by the untrusted device 116 pattern recognition, etc. In response the network sanitization server 221 may provide instructions to ignore/drop the communication, to respond in a certain way to the untrusted device (e.g. deny a request) or to create a new communication. For this last option, the network sanitization server 221 may provide instructions on a particular safe framework known to the network sanitization device 201 to use or may provide the safe framework to the network sanitization device 221. This may be communicated, e.g., as a new entry to the network sanitization device 201's translation table. In response to receiving the new entry, the network sanitization device 201 may update its translation table to incorporate therein the new entry. In one embodiment within this variant, in response to a query from the network sanitization device 201, the network sanitization server 221 transmits a message to the network sanitization device 201 comprising one or more or none new entries to add to the network sanitization device 201's translation table. Upon receiving the message, the network sanitization device 201 updates the translation table and processes the communication which prompted the query to the network sanitization server 221. If the new entries provide a suitable template, the communication is accordingly sanitized. If no new entries are useful, the communication is dropped.

In the primary example provided herein, the network sanitization device 201, and more particularly the processing logic 375, is configured to ignore received communications from an untrusted device 116 for which a purpose cannot be determined, and/or for which the network sanitization device has no strategy to process the communication. In such cases the received communication is simply dropped, with no further steps taken. This prevents harm to be done to the network 205 or to network elements within or beyond it, and prevents compromise of sensitive information, by new/unknown methods. Optionally, the network sanitization device may provide generic denial responses if an appropriate such response is known, although in the present example such unknown communications are simply dropped.

The network sanitization device may keep comprise a cache to avoid having to communicate with the server 221 if a similar communication has been (e.g. recently) received from the untrusted device 116 for which a processing approach has already been received from the network sanitization server 221. Any method to ensure the cache is fresh and up-to-date may be used.

In one variant, the network sanitization device may be self-sustaining performing its own internal evaluation of communications received from an untrusted device 116 except that if it receives a communication that it does not understand or know how to process, rather than to ignore it, it then communicates with the network sanitization server 221 in the manner described herein to find out how to process the communication. The instructions received from the server are used, in one example, to update the translation table (or more generally the evaluation algorithm) at the network sanitization device such that this type of communication is now known to the network sanitization device. Although shown as within the network 205, which in the example illustrated is a LAN, the network sanitization server 221 may be located elsewhere, e.g. accessible via the internet 150. It may thus be used to keep network sanitization devices up to date with new types of communications (e.g. new communication protocols), e.g. for dedicated function devices. Thus the network sanitization device may be a self-updating device, constantly kept up-to-date so that it does not need to be changed when, e.g., a new IP camera streaming protocol is adopted.

In such a case, the network sanitization device may be configured to receive instructions from the network sanitization server 221 to keep its translation table, or more broadly its evaluation algorithm, up to date. For example, the translation table may be treated as a cache with entries having a lifespan after which they become obsolete and must be repopulated with instructions from the network sanitization server 221 (in one example, if the network sanitization server 221 cannot be reached, the obsolete entry may be used). Alternatively or additionally, the network sanitization server 221 may be configured to push updates to the network sanitization device to update out-of-date evaluations methods (e.g. entries in the translation table) by providing instructions in a manner similar to described but without prompting from the network sanitization device. Correspondingly, the network sanitization device may be configured to receive and execute such instructions to update its evaluation method.

The allowed framework may be a framework for communications which has been determined to be safe, e.g. safe for a sensitive network as it does not include harmful violations of the network. In the present example, the allowed framework comprises a safe protocol for allowed communications and safe parameters for the communication. In particular, for the IP camera 115, the allowed framework may include a particular safe protocol comprising a certain set of communications for providing camera data (e.g. video) over the network, and the safe parameters to use with the safe application-level protocol may include the network address of approved recipients of such data.

Accordingly, the network sanitization device 201 may create application-level communications using the safe protocol (e.g. by selecting a particular message from the safe protocol) and the safe parameters (e.g. by populating the communication with or adapting it to the safe parameters) and a communication received from the untrusted device (e.g. by populating the created communication with data, e.g. video data, from the received communication). In the present example, the created communication is in fact a re-creation of the received communication, in that it has a 1:1 relationship with the received communication (at the application level), and it may also transmit the same payload data, although it is guaranteed to follow the safe framework since it is built from the ground up using the safe framework. This may be done using a rewriter that passes through more information, i.e. trusts a wider portion of the input packet if matching certain criteria.

In one embodiment, a network sanitization device may be configured to receive, e.g. over the network 205, the allowed framework or part thereof. This may be, for example, from a network sanitization server 221. This may be in response to a request for treatment of a communication to the network sanitization server 221, but may also be received unsolicitedly, or solicited for the mere purpose of populating its evaluation algorithm (e.g. the translation table, or ablack list or gray list). To this end, processor may be configured to receive over the sensitive network interface a received set of parameters and to establish the trusted parameters on the basis of the received set of parameters.

In the present example, the network sanitization device 201 may be configured to suit different dedicated-function untrusted devices (or to limit the function on a network of a device to a particular desired function) by providing a different allowed framework permitting the communication of certain types of data corresponding to the dedicated function (or desired limited function) of the device. Adaptation to a particular function set may also comprise creating a dedicated translation table for the dedicated-function device.

In one particular example, the network sanitization device 201, may comprise a plurality of translation tables dedicated to different dedicated-function devices. This may be implemented in practice as one multi-device translation table comprising different portions applying to different devices, some of which may overlap. Thus the network sanitization device 201 may be adapted to sanitize network communications for more than one dedicated-function device. In such a case, the network sanitization device 201 may use any suitable means for determining the type of dedicated-function device to which it is connected and select the proper sanitization algorithm (in this case the proper translation table). In one example, the network sanitization device 201 comprises a MAC address lookup table that compares a portion of an incoming communication's originating MAC address with a stored variable and determines which network sanitization algorithm to use based on the presence of a match. In one example, the MAC address lookup table may be included within the multi-device translation table wherein every table entry comprises a variable defining a MAC address portion defining the devices for which the table entry applies. When looking up a communication in the translation table, the network sanitization device 201 compares the MAC address, or portion thereof, with the variable in table entries to determine which table entries apply. Other device identifiers, other than MAC addresses may be similarly used.

In this example the processing logic 375 (and here the processor 380) is configured to establish a tunnel (in particular a reverse tunnel) with a destination network element e.g. within the network 205, in particular here with the surveillance server 220, to transmit the safe communications to the destination network element through the tunnel.

The network sanitization device 201 may also comprise a black list of forbidden communications. To the end the processing logic 375 (and more particularly the processor 380) may be configured to evaluate a communication received from untrusted device 116 by looking up the communication in the black list and ascertaining that the communication is not an allowed transmission if it is found in the black list. This may be done supplementally to searching the communication in the translation table, e.g. before such that the black list trumps the translation table. Alternatively, the white and black lists may both be combined in a single list of communications with allowed communications having an entry on how to create a new communication.

Optionally, there may be certain communications which the network sanitization device 201 (and in this example the processing logic 375) is configured to process by doing something other than merely dropping the communication or creating a new one. These may include requests (e.g. that may have been intended for a remote network element) that the network sanitization device 201 (and here the processing logic 375) is configured to respond to directly. These may be considered in some embodiments as a particular class of forbidden communications, e.g. as "supported requests" or "gray communications" which may be listed in a "gray list" which may be part of the black list.

In one example, the network sanitization device 201 may receive from an untrusted device 116 an NTP request for time data destined for some remote network element but the processing logic 375 may be configured, e.g. by having a corresponding entry in a gray list, to respond directly to the request by creating a response (e.g. using its own time data) to the NTP request and causing the isolated network interface 371 to transmit the response to the untrusted device 116 from which it originated. The response may be configured to resemble a response from the intended recipient of the untrusted device 116's NTP request. Thus the network sanitization device 201 may provide simulated responses to requests from an untrusted device 116. In an alternate example, the network sanitization device 201 could have had a translation table entry for such a request, but with safe parameters that would have directed it to a different destination, to avoid hidden communications to an unknown server.

In some embodiments, the network sanitization device 201 may act as a proxy for a request, by generating, in response to an original request from an untrusted device 116, an auxiliary request to obtain data for responding to the original request. The auxiliary request may then be transmitted towards a third network element (e.g. an NTP server). This may be a different third network element from the destination of the original request, which may be defined based on an allowed framework (e.g. safe parameters as found in the translation table). The network sanitization device 201 may then be configured to receive are response to the auxiliary request (an "auxiliary response") from the third network element, and to generate based at least in part thereon a response to the original request, e.g. using content derived from the auxiliary response. Because in such a case the request gives rise to the generation of a new communication by the network sanitization device 201, this may be seen as a subtype of allowed communications (e.g. from the translation table) which involve a response.

For communications in the translation table, the network sanitization device 201 (here, its processing logic 375) may be configured to add fuzziness to the timing of re-created communications sent in response to a communication from an untrusted device 116. To this end, the network sanitization device may incorporate an intentional pseudo-random jitter to the timing of communications to prevent leaking data using communication timing. In another example, the timing of communications from the untrusted device 116 output onto the network 205 by the network sanitization device 201 may be provided with constant timing to prevent timing side-channel attacks. To this end, rewriting and/or transmission of communications over the network may be subjected to a timing modifier. In practice, this may be implemented using an egress queue with output triggered on a constant timing basis.

The network sanitization device 201 may also be configured to act as a vigil and report suspicious activity to a server. In the present example, the network sanitization device is configured for communicating with a server, e.g. the surveillance server 220 or network sanitization server 221, to provide thereto reports on suspicious activities, e.g. unauthorized communications.

The network sanitization device 201 is configured for implementing network sanitization to prevent unwanted communications from the untrusted dedicated-function device from harming the sensitive network, e.g. by the mechanisms provided herein. In particular in this example, network sanitization comprises enforcing a particular set of communications according to a safe protocol and safe parameters on the basis of the output of the untrusted equipment, e.g. untrusted device 116, such that only the particular set of communication functions according to the safe protocol and the safe parameters enters the sensitive network from the network sanitization device. But the network sanitization device is further configured to detect and report unauthorized communications.

In particular, the processing logic 375 (and more particularly the processor 380) is configured to detect unauthorized communications. Unauthorized communications in this context may in some examples comprise any communication not in the translation table. Alternatively, unauthorized communications in this context may comprise any communication not in the white or, if present, gray list. Alternatively, unauthorized communications in this context may comprise any communication not recognized by the network sanitization device 201/processing logic 375, e.g. by virtue of being absent from the white, gray and black lists if such are used. In the present example, detection of unauthorized communication comprises detection of communications either in the gray list (if present), the black list or unrecognized.

The processing logic 375 may process such communications in any suitable manner, such as described herein, however in the present example, the processing logic 375 is further configured to generate a report indicative of the unauthorized communication. More specifically in this case, the processing logic generates a communication, which may be an application-level communication comprising a message providing information on the unauthorized communication. The message may comprise, for example, header information from the unauthorized communication (e.g. safely encapsulated within a packet payload) including intended destination, packet type (if known), etc. . . . The message may also comprise the payload of one or more unauthorized communication encrypted so as to prevent leaking the information it contains. In one example of reporting, the network sanitization device 201 comprises a log in the memory 385 which the processor 380 populates with details of unauthorized communications. This log may be periodically pulled (e.g. when it reaches a certain size/fullness and optionally emptied and all or some of its contents may be used to generate the report. It will be noted that not all unauthorized communications need necessarily be included in the log. The selection of what to log, and/or which portion of the log to transmit may be designed so as to not overload the system. In one example only communications on a stored blacklist are logged. In another simple implementation, reporting may be implemented using Syslog over TCP to stream entries.

In the present example, the network sanitization device 201 may be configured to provide different kinds of reports. In particular, the processing logic may be configured to provide medium-suspiciousness reports, high-suspiciousness reports, and unknown communication reports.

In one example, the processing logic 375 is configured to generate a medium-suspiciousness report upon receiving a communication found in the gray list. The medium-suspiciousness report comprises a body having data on the communication including communication type, intended recipient and time. The processing logic 375 is configured to provide the medium-suspiciousness report to the network interface 390 and to cause it to transmit the report to the network sanitization server 221 for archiving. The network sanitization server 221 may be configured to track patterns in such communications to detect malicious activity.

In one example, the processing logic 375 is configured to generate a high-suspiciousness report upon receiving a communication found in the black list. The high-suspiciousness report comprises a body having data on the communication including communication type, intended recipient and time. The processing logic 375 is configured to provide the high-suspiciousness report to the network interface 390 and to cause it to transmit the report to the network sanitization server 221. The network sanitization server 221 may be configured to track patterns in such communications to detect malicious activity. The network sanitization server 221 may also process the report to determine if any immediate action is required. In one example, the processing logic 375 is also to cause the network interface to transmit the report to the surveillance server 220 such that the surveillance server can alert surveillance personnel of the suspicious activity, as it may be configured to do so. (This may also be done for other types of reports.)

In one example, the processing logic 375 is configured to generate an unknown communication report upon receiving a communication for which evaluation cannot determine a nature. This can be, for example, communications for which a purpose cannot be ascertained, e.g. communications not found in the white, gray or black lists. The unknown communication report comprises a body merely indicating the presence of the unknown communication or having data extracted from the communication, e.g. destination, timing and/or other data. In one example, however, the entire unknown communication is provided in the report, optionally in encrypted form. The same could be done for other report types. The processing logic 375 is configured to provide the unknown communication report to the network interface 390 and to cause it to transmit the report to the network sanitization server 221, and optionally to the surveillance server 220. The network sanitization server 221 may be configured evaluate the unknown communication report. In one example, an unknown communication report is treated as a request for evaluation by the network sanitization sever 221 and the network sanitization server provides a response, e.g. to update the translation table of the network sanitization device 201 as described herein.

In one example, the network sanitization device 201 comprises a tangible memory, which may be memory 385, comprising a log of unauthorized communications. The processing logic is configured to store unauthorized communication reports in the log of unauthorized communications.

Network sanitization may also be distributed. There are several advantages to keeping the network sanitization device 201 as computationally simple as possible and to have the bulk of the work done elsewhere, e.g. at a server like the network sanitization server. This may be desirable, for example in order to reduce power requirements of the network sanitization device 201 such that it may be powered by a battery or powered by power over Ethernet (PoE) while still providing PoE to the untrusted device 116. This may also be desired for the variety of advantages to centralizing sanitization for a number of untrusted devices 116 such as finding suspicious patterns existing across many devices or for ease of updating the sanitization algorithm for all untrusted devices 116.

In one embodiment, the network sanitization device 201 which may be a network edge enforcement device intercepts every communication originating from the untrusted device 116. Rather than to necessarily sanitize the communication directly, the network sanitization device 201 may establish, e.g. over the network 205, a connection with a network sanitization server 221. The network sanitization device may re-route all intercepted communications from the untrusted device 116 to the network sanitization server 221 to be sanitized by the network sanitization server 221. The network sanitization server 221 may comprise processing logic, which may be similarly configured to the processing logic 375 described herein, and which may similarly include a processor and a computer-readable memory comprising program code instructing the processor to perform the functions described herein thereby configuring the processor and more broadly the processing logic to perform the functions provided herein. The network sanitization server 221 may perform network sanitization in the same manner as described in reference to the network sanitization device 201 (with the exception, of course being that the functions such as translation table updating and suspicious activity reporting for which the network sanitization device 116 relied on the network sanitization server 221 need not a communication between the two since the network sanitization is already being performed at the network sanitization server 221; however the network sanitization server 221 may receive updates to the translation table and provide reports to another server, e.g. a server from the issuing company to continuously improve network sanitization).

In this example, the network sanitization device 201 can be a very simple device that merely re-routes traffic from an untrusted device 116 to a dedicated server, although this re-routing can be provided with additional security. For example, it may be encrypted and the connection with the network sanitization server may be done by a virtual tunnel (e.g. reverse tunnel) using, for example, a stream-oriented protocol (e.g. TCP), or a datagram-oriented protocol (polling a shared message queue). SSH port tunneling, HTTP tunneling or DNS tunneling may be used. Criteria to consider when selecting the tunneling method include additional services (integrity and confidentiality such as in the case of SSH) and environmental acceptability (e.g. should be able to pass firewalls used).

Thus is provided a network sanitization system comprising the network sanitization device 201 which re-routes traffic from an untrusted device 116 to a network sanitization server 221, and the network sanitization server which performs network sanitization in any of the manners described herein. Alternatively is also provided network sanitizer that is distributed across multiple trusted network elements (here, a trusted network server: the network sanitization device 201 and a trusted network edge device: the network sanitization server 221) which has an internal interface (the interfaces through which the two communicate with each other, namely network interface 390 and the equivalent at the network sanitization server 221) for establishing an internal link between them.

In one embodiment, the network sanitization server 201 comprises a Raspberry Pi™ which provides at least the hardware for the processing logic 375.

In some examples provided herein the connections between the network sanitization device 201 and the untrusted device 116, and between the network sanitization device 201 and the network 205 have been described as physical. In alternative embodiments, one or both interfaces of the network sanitization device 201 may be implemented using WiFi technology. The network sanitization device 201 may have a WiFi interface to communicate with an untrusted device 116 using WiFi. In such a case the network sanitization device 201 behaves as an access point (AP) for a WiFi network of which, in one example, it is the only access point. If the untrusted device 116 is designed to be connected to a network by WiFi, it may be connected to the network sanitization device 201 using its method. The external access interface 370 may thus comprise a WiFi interface. It may be associated with a (e.g. preset) WiFi password or other authentication mechanism including the router-button mechanism. It may still be an isolated network interface 371 since the network it forms with the untrusted device(s) 116 does not connect the untrusted device(s) 116 with the network 205.

Likewise the network interface 390 may comprise a WiFi interface for connecting to the network using WiFi. In this case, the network sanitization device 201 connects to an access point of the network 205. In one example where both the external access interface 370 and the network interface 390 use WiFi, the processing logic 375 is configured to set the channel of the external access interface 370 to a different channel than the one used by the network interface 390 to avoid interference.

Figure 4A:
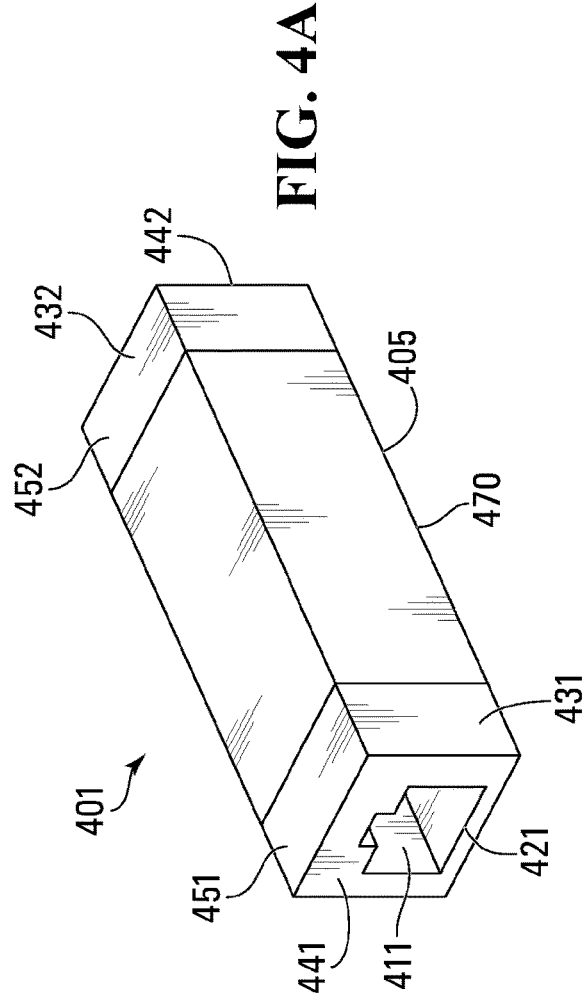
FIG. 4a shows a rear-right perspective view of a network sanitization device in accordance with another non-limiting example.
Figure 4B:
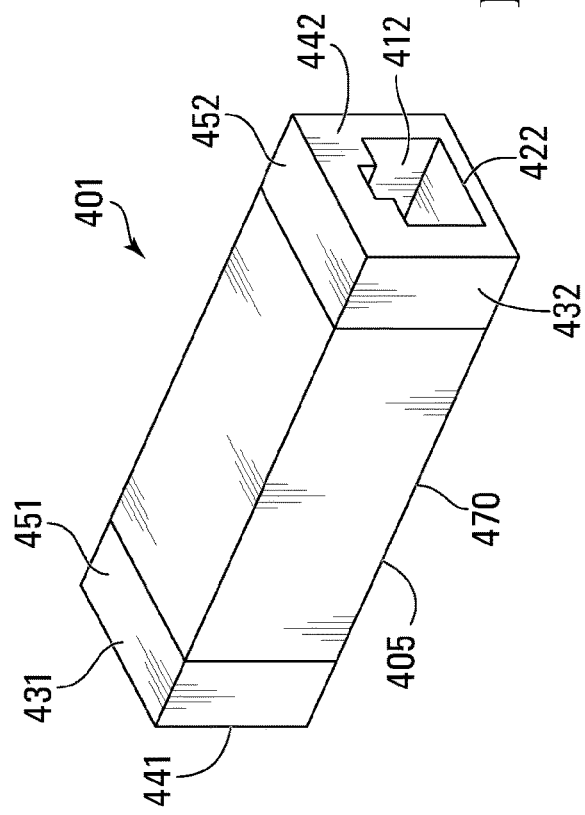

FIG. 4a and FIG. 4b illustrate a network sanitization device 401 according to a particular example of physical implementation. This may be the physical implementation of any suitable one of the herein-described examples. The network sanitization device 401 comprises a rigid enclosed body 405 having no display or user input interface. The network sanitization process described herein does not necessarily require any user input and the simple physical implementation shown here allows the network sanitization device 401 to be a low-power device that is easy to install with little visual burden.

The network sanitization device 401 comprises an interface for connecting to the untrusted dedicated-function device, such as the untrusted device 116 such as the IP camera 115. In this example this interface may be an isolated network interface as described herein. In this example, this interface is also an external access interface as described herein. The isolated network interface of this example comprises a first physical network connector 411. The first physical network connector is comprised within a first connector port 421 for connecting to the untrusted device by a first wire-based networking protocol. The wire-based protocol is in this example an Ethernet protocol and the first connector port 421 is an 8P8C port. Note that the term "indicia" is used as both a singular (rather than "indicium") and a plural herein.

The network sanitization device 401 comprises an interface for connecting to a network such as the sensitive network 205. In this example this interface may be like the network interface 390 as described herein. In this example this interface is a sensitive network interface for connecting to a sensitive network. The sensitive network interface of this example comprises a second physical network connector 412. The second physical network connector is comprised within a second connector port 422 for connecting to the network by a second wire-based networking protocol, which may be the same as the first wire-based protocol. The second wire-based protocol is in this example an Ethernet protocol and the second connector port 422 is an 8P8C port.

The network sanitization device 401 comprises a processing logic tangibly contained within the rigid enclosed body 405 and in communication with the isolated network interface and the sensitive network interface, configured for implementing network sanitization to prevent unwanted communications from the untrusted dedicated-function device from harming the sensitive network. The processing logic of the network sanitization device 401 may comprise the processing logic 375 as described in relation to any of the suitable examples provided herein.

In the example shown, the isolated network interface comprises a first visual indicia on the rigid enclosed body in proximity to the first physical network connector providing a visual indication that the first physical network connector is for connecting with untrusted equipment. In particular, the first visual indicia is comprises a coloration of a first portion 431 of the rigid body 405 in a color indicative that the first physical network connector is for plugging untrusted equipment. In this example, the untrusted side is colored a bright red color indicative of danger.

In the example shown, the isolated network interface also comprises a second visual indicia on the rigid enclosed body in proximity to the second physical network connector providing a visual indication that the second physical network connector is for connecting with a network (and in particular here a trusted/sensitive network). In particular, the second visual indicia is comprises a coloration of a second portion 432 of the rigid body 405 in a color indicative that the second physical network connector is for plugging into a trusted/sensitive network. In this example, the network side is colored a bright green color indicative of safety.

In the example shown, the first and second visual indicia are adjacent to the first and second physical network connectors 411, 412, respectively such that they can be easily visually associated with their respective network connectors. In particular, the first and second connector ports 421, 422 are colored in the color of the visual indicia (red and green, respectively) as is a portion of the rigid body 405 surrounding it. Thus the connector ports 421, 422 comprise the visual indicia, although they could comprise it only in part, if only partially colored.

In this particular case, the rigid enclosed body 405 comprises first and second opposed portions 451, 452, comprising first and second opposed sides 441, 442 of the rigid body. The first and second opposed portions 451, 452 are longitudinally opposed from one another on the rigid enclosed body 405 as are the first and second opposed sides 441, 442. The first and second opposed portions 451, 452 each of comprises respectively the first and second physical network connectors. The first and second opposed sides 441, 442 each receive respectively the first and second physical network connectors. The first and second opposed portions 451, 452 are where the first and second visual indicia are respectively located. In this example the first and second opposed portions 451, 452 comprise the first and second opposed sides 441, 442 which also comprise the first and second visual indicia. In this example, the first and second visual indicia cover substantially all of the first and second opposed sides 441, 442, respectively as well as substantially all of the first and second opposed portions 451, 452, respectively.

The rigid enclosed body 405 in this example also comprises a neutral portion 470, in this example a middle portion, that separates the first and second opposed portions 451, 452, and that does not comprise the first and second visual indicia.

Additionally or alternatively, the first and second visual indicia may each comprise a pictogram, e.g. on a portion of the rigid body indicative that the first physical network connector is for plugging untrusted equipment and the second physical network connector is for connecting to a network, e.g. a trusted network, respectively, is for connecting with untrusted equipment and the sensitive network, respectively. A pictogram for the first visual indicia may be, for example an illustration of a camera, if the network sanitization device 401 is to be used with an IP camera 115. It may also be a drawing of a virus (or a bug) or an illustration of an open lock. A pictogram for the first visual indicia may be, for example a pictogram indicative or a pictogram of something typically found on a network such as a computer. It may also be a drawing of a shield or an illustration of a closed lock.

Additionally or alternatively, the first and second visual indicia may each comprise text, e.g. on a portion of the rigid body indicative that the first physical network connector is for plugging untrusted equipment and the second physical network connector is for connecting to a network, e.g. a trusted network, respectively, is for connecting with untrusted equipment and the sensitive network, respectively. For example a text in the first visual indicia may say "camera", if the network sanitization device 401 is to be used with an IP camera 115. It may also say "unsafe" or something of the sort. A text in the first visual indicia say, for example "network" or "safe".

FIGS. 3a and 3b shows another example of a first visual indicia 361 and a second visual indicia 362. There too the first and second visual indicia 361, 362 are in first and second opposed portions 351, 352, respectively, on opposed sides of an enclosed rigid body adjacent a connector, but here they are located only in part of the opposed sides and comprise colors (red and green, respectively) and text.

As will be appreciated the present invention provides a remarkably useful device that can be a "plug-and-forget" system that operates independently once plugged. It may have wide applicability with inexperienced users, e.g. people that have bought a security camera online for the first time, as well as be widely distributed in large networks, e.g. surveillance networks that use hundreds of cameras. In both cases, the simplicity, and small form of the package ensures that it can be easily installed, in most settings with little risk of improper installation. Since network security is such an important issue, this is a particularly important point.

Although the body has been described as rigid and enclosed, it is to be understood that it does not need to be absolutely so. The body may, for example comprise venting openings to allow air circulation. It may also have a certain flexibility to account for the limits of rigidity of materials as is commonly found, for example, in plastic electronic devices. In alternate examples the body may be open, semi-enclosed and may be bendable in certain areas (preferably provided that the electronics are protected from breaking). Likewise although the first and second connector ports 421, 422 are shown here on opposed sides, they could also be provided on the same side of the body, due to hardware design constraints, for example.

Certain types of dedicated-function devices such as IP cameras 115 can operate using power over Ethernet (PoE). Advantageously, this makes it unnecessary to run a power cable in addition to the network cable to the untrusted device. In some embodiments, the network sanitization device 201 may operate on PoE.

Figure 5A:
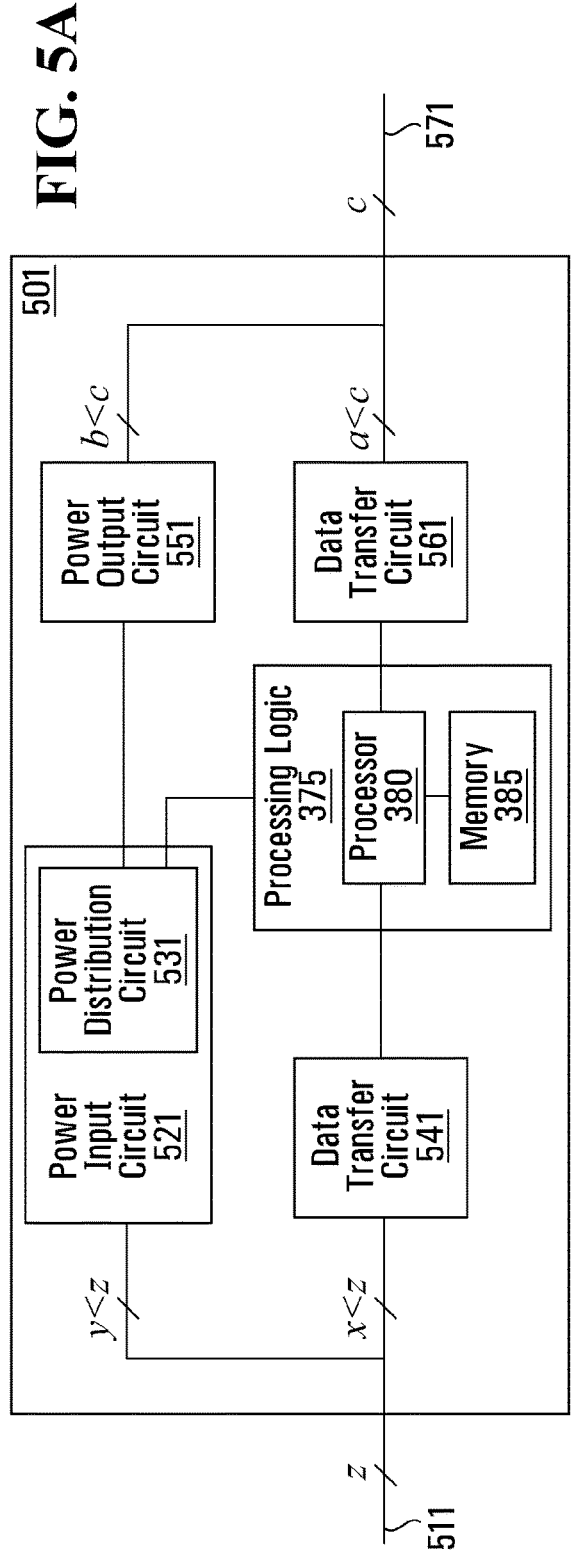
FIG. 5a shows a block diagram of a network sanitization device with passive PoE capability in accordance with a non-limiting example.
Figure 5B:
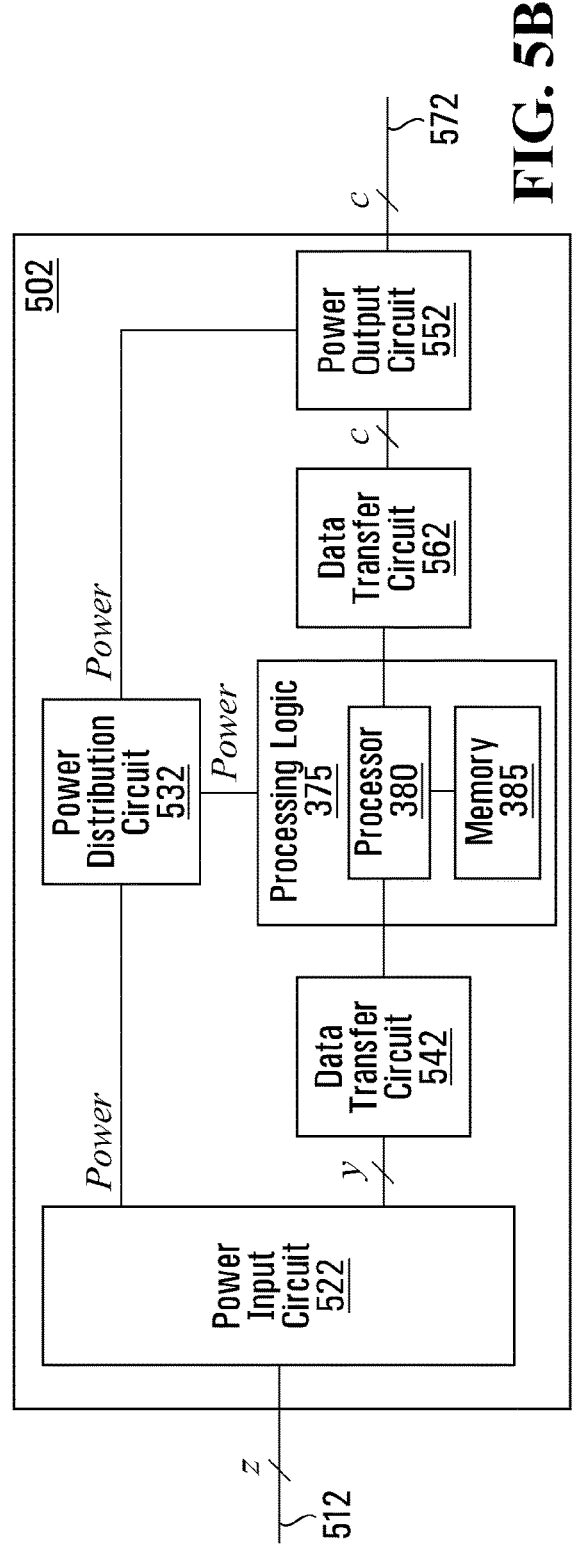
FIG. 5b shows a block diagram of a network sanitization device with active PoE capability in accordance with a non-limiting example.

In a particularly advantageous development, a network sanitization device may operate on PoE while providing PoE to the untrusted device without requiring an additional power cable. FIG. 5a and FIG. 5b show block diagrams of network sanitization devices 501, 502, respectively, according to particular examples of implementation. As mentioned, a network sanitization device as described herein may be implemented as a low-power device.

In some embodiments, a network sanitization device comprises, as described, an isolated network interface (or external access interface) for connecting to an untrusted device 116 and a network interface (called here a sensitive network interface) for connecting to a network such as network 205.

The isolated network interface may comprise a first physical network connector for connecting to a first network cable in communication with the untrusted dedicated-function device (such as the one of the example of FIG. 4a and FIG. 4b). Now in one embodiment, the isolated network interface comprises a first data transfer circuit and a power output circuit. The first data transfer circuit comprises circuitry for transferring data to and from the first network cable. In one example this may include circuitry for to implement Ethernet protocols. The power output circuit is configured for injecting power into the first network cable for powering the untrusted dedicated-function device using PoE injection.

The sensitive network interface may comprise a second physical network connector (such as the one of the example of FIG. 4a and FIG. 4b) for connecting to a second network cable in communication with a network such as network 205. Now in one embodiment, the sensitive network interface comprises a first data transfer circuit and a power output circuit. Now in this embodiment, the isolated network interface comprises a second data transfer circuit and a power input circuit. The second data transfer circuit comprises circuitry for transferring data to and from the second network cable. In one example this may include circuitry to implement Ethernet protocols. The power input circuit is configured for extracting power from the second network cable for powering the network sanitization device.

The network sanitization device of this embodiment comprises processing logic powered by the power extracted from the second network cable. The processing logic is in communication with the isolated network interface and the sensitive network interface and is configured for implementing network sanitization to prevent unwanted communications from the untrusted dedicated-function device from harming the sensitive network. To this end the processing logic may comprise the processing logic 375 as described in relation to any of the suitable examples provided herein.

The network sanitization device of this embodiment further comprises a power distribution circuit for distributing power extracted from the second network cable by the power input circuit to the processing logic and to the power output circuit. Although this is described as a separate entity from the power output circuit, the power distribution circuit can be integral with the power output circuit.

FIG. 5a shows an example embodiment wherein a network sanitization device 501 receives power from the network connection using passive PoE. Here the second network cable 511 has z wire pairs of which y carry power and x carry data. A power input circuit 521 comprises a passive PoE extractor for receiving a voltage across at least one wire pair (from among the y that carry power) that is not used to transfer data. The second data transfer circuit 541 uses other wire pairs (from among the x that carry data) to transfer data from and/or to the second network cable 511. The second data transfer circuit 541 receives data to be transferred to the second network cable 511 and/or provides data transferred from the second network cable 511 directly or indirectly via additional modules to the processing logic shown here which may comprise the processing logic 375 as described in relation to any of the suitable examples provided herein.

A power distribution circuit 531, which here is comprised within the power input circuit 521, transfers a portion of the power extracted from the second network cable 511 to the processing logic, while the rest is transferred to a power output circuit 551. In this example the network sanitization device 501 provides power to the untrusted device 116 also using passive PoE. A first network cable 571 both carries power to the untrusted device 116 and transfers data with the untrusted device 116. Here the first network cable has c wire pairs (in particular c may equal z) of which b carry power (in particular, b may equal y) and a carry data (in particular a may equal x). A power output circuit 551 transfers power to the first network cable 571 and in particular comprises a passive PoE injector for applying a voltage to at least one wire pair (from among the b wire pairs) that is unused by a first data transfer 561 circuit to transfer data. Although the power output circuit 551 is shown as separate circuit from the power distribution circuit 531, much of the work to inject power into the wires may be undertaken by the power distribution circuit 531, particularly if the power distribution circuit 531 distributes power to the first power cable 571 by applying a voltage directly to wire pairs. In such a case the power output circuit 551 may simply be a connection between the power distribution circuit 531 and the first physical network connector 571. The first data transfer circuit 561 uses other wire pairs (from among the a that carry data) to transfer data from and/or to the first network cable 571. The first data transfer circuit 561 receives data to be transferred to the first network cable 571 and/or provides data transferred from the first network cable 571 directly or indirectly via additional modules to the processing logic shown here.

FIG. 5b shows an example embodiment wherein a network sanitization device 502 receives power from the network connection using active PoE. Here the second network cable 512 has z wire pairs of which all carry data. A power input circuit 522 comprises an active PoE extractor for extracting a common-mode voltage from at least one wire pair used by a second data transfer circuit 542 to transfer data. This may be extracted by center tap. The second data transfer circuit 542 is connected to the power input circuit 522 by data signaling albeit with the power extracted/absent. The second data transfer circuit 542 receives data to be transferred to the second network cable 512 and/or provides data transferred from the second network cable 512 directly or indirectly via additional modules to the processing logic shown here which may comprise the processing logic 375 as described in relation to any of the suitable examples provided herein.

A power distribution circuit 532, receives power extracted from the second network cable 51 by the power input circuit 522 and transfers a portion of the power to the processing logic, while the rest is transferred to a power output circuit 552. In this example the network sanitization device 502 provides power to the untrusted device 116 also using active PoE. A first network cable 572 both carries power to the untrusted device 116 and transfers data with the untrusted device 116. Here the first network cable has c wire pairs (in particular c may equal z) all of which carry data. A first data transfer circuit 562 uses extracts/applies signaling to transfer data from and/or to the first network cable 572. The first data transfer circuit 562 receives data to be transferred to the first network cable 572 and/or provides data transferred from the first network cable 572 directly or indirectly via additional modules to the processing logic shown here. A power output circuit 552 receives power from the power distribution circuit 532 and comprises a passive PoE injector for applying a voltage to at least one wire pair (from among the c wire pairs) in the first power cable.

By adapting the power distribution circuit and the power input and power output circuits, a network sanitization device may support active PoE at one end and passive at the other. Likewise using hybrid injection/extraction technology one or both interfaces may be capable of both active and passive PoE.

Although in many of the examples provided herein, network sanitization devices have been described as enforcing a desired or dedicated function for a dedicated-function untrusted device, it will be appreciated that a network sanitization device may be used/adapted for enforcing a particular desired communication function to a multi-function (or general-purpose) device. For example, a network sanitization device as described for being used with an IP camera 115, may be used with, e.g., computer having a camera to prevent any communication from the computer with the network other than to stream the camera data according to a safe framework. In this manner, the network sanitization device 201 may transform a multi-function device into a dedicated-function device from the standpoint of the network. In such an implementation, the sanitization device becomes a function constraining device.

Moreover, although the present examples have been described with each network sanitization device being connected to one untrusted device and one network, a network sanitization device may be adapted to have multiple connections for communicating with multiple dedicated-function devices. Such a device may also be adapted to have multiple network connection for connecting with more than one network. In the latter case, it may comprise decision logic for deciding which network to send re-created communications over, which decision may or may not be based on the communications received from an untrusted device being re-created. For example, the decision logic may be informed by orders received from a server, e.g. a surveillance server located in one of the multiple networks to which it is connected, or may be based on external factors such as the time of day, network or physical location of the IP camera 115 or network sanitization device itself, or other factors. Alternatively, the choice of network over which to transmit communications could be based on the content of the communication being re-created such as based on the original destination of a communication received from an untrusted device. The multiple connections for multiple untrusted devices may each have a corresponding physical connector and connector ports as may the multiple network connections, if present. Alternatively the multiple untrusted devices and/or networks may be connected via WiFi interface or through a switch or similar device to the network sanitization device. In the latter case, the network sanitization device also may comprise receiving logic configured for determining the origin of a communication received from an untrusted device.

What is claimed is:

1. A network edge enforcement device for creating an enforced edge of a sensitive network and limiting access to the sensitive network comprising:
   a. a sensitive network interface for connecting to, and communicating over, the sensitive network;
   b. an external access interface for connecting to an untrusted device outside of the sensitive network; and
   c. a processor in communication with both the external access interface and the sensitive network interface and having a programmed protocol, the processor being configured for emulating the functionality of the untrusted device by generating safe communications using the programmed protocol, a set of trusted parameters, and data obtained from the untrusted device over the external access interface and transmitting the safe communications onto the sensitive network over the sensitive network interface,
   wherein the sensitive network is a surveillance network and the external access interface is configured to connect to an Internet Protocol (IP) camera, wherein the programmed protocol includes at least a subset of a video transmission protocol, and wherein the safe communications comprise video transmission communications prepared in accordance with the video transmission protocol and at least a portion of the trusted parameters.

2. The network edge enforcement device of claim 1, wherein the set of trusted parameters comprises a destination address within the sensitive network.

3. The network edge enforcement device of claim 2, wherein the processor is further configured to establish a tunnel between the processor and a destination network element at the destination address within the sensitive network and to transmit the safe communications to the network element over the tunnel.

4. The network edge enforcement device of claim 1, wherein the sensitive network interface comprises a first physical network connector comprised within a first connector port for connecting to, and communicating over, the sensitive network by a first wire-based networking protocol.

5. The network edge enforcement device of claim 4, wherein the external access interface comprises a second physical network connector comprised within a second connector port for connecting to the untrusted device by a second wire-based networking protocol, and wherein the first physical network connector and the second physical network connector are not in direct communication but are each in communication with the processor which is configured not to pass-through any communications from the second physical network connector to the first physical network connector.

6. The network edge enforcement device of claim 4, wherein the first wire-based networking protocol is an Ethernet protocol.

7. A network edge enforcement device for creating an enforced edge of a sensitive network and limiting access to the sensitive network comprising:
   a. a sensitive network interface for connecting to, and communicating over, the sensitive network;
   b. an external access interface for connecting to an untrusted device outside of the sensitive network; and
   c. a processor in communication with both the external access interface and the sensitive network interface and having a programmed protocol, the processor being configured for emulating the functionality of the untrusted device by generating safe communications using the programmed protocol, a set of trusted parameters, and data obtained from the untrusted device over the external access interface and transmitting the safe communications onto the sensitive network over the sensitive network interface,
   wherein the external access interface comprises a first WiFi interface for establishing a first WiFi network using a first communication channel and connecting to the untrusted device over the first WiFi network.

8. The network edge enforcement device of claim 7, wherein the sensitive network interface comprises a second WiFi interface for establishing a WiFi connection using a second communication channel to the sensitive network, wherein the second communication channel is different from the first communication channel, and wherein the first WiFi interface and the second WiFi interface are not in direct communication but are each in communication with the processor which is configured not to pass-through any communications from the first WiFi interface to the second WiFi interface.

9. The network edge enforcement device of claim 7, wherein the set of trusted parameters comprises a destination address within the sensitive network.

10. The network edge enforcement device of claim 9, wherein the processor is further configured to establish a tunnel between itself and a destination network element at the destination address within the sensitive network and to transmit the safe communications to the network element over the tunnel.

11. The network edge enforcement device of claim 7, wherein the sensitive network is a surveillance network and the external access interface is configured to connect to an IP camera, wherein the programmed protocol includes at least a subset of a video transmission protocol, and wherein the safe communications comprise video transmission communications prepared in accordance with the video transmission protocol and at least a portion of the trusted parameters.

12. A network sanitization device for protecting a sensitive network from an untrusted dedicated-function device, the network sanitization device comprising:
 a. a rigid enclosed body having no display or user input interface;
 b. an isolated network interface for connecting to the untrusted dedicated-function device comprising
  i. a first physical network connector; and
  ii. a first visual indicia on the rigid enclosed body in proximity to the first physical network connector providing a visual indication that the first physical network connector is for connecting with untrusted equipment; and
 c. a sensitive network interface for connecting to the sensitive network comprising:
  i. a second physical network connector; and
  ii. a second visual indicia on the rigid enclosed body in proximity to the second physical network connector providing a visual indication that the second physical network connector is for connecting with the sensitive network; and
 d. processing logic comprising a processor and a memory contained within the rigid enclosed body and in communication with the isolated network interface and the sensitive network interface, said memory comprising a program code for causing said processor to implement network sanitization to prevent unwanted communications from the untrusted dedicated-function device from harming the sensitive network.

13. The network sanitization device of claim 12, wherein said program code causes said processor to enforce a particular set of communications according to a safe protocol and safe parameters on the basis of the output of the untrusted equipment, wherein only the particular set of communication functions according to the safe protocol and the safe parameters enters the sensitive network from the network sanitization device.

14. The network sanitization device of claim 12, wherein said processor is in communication with the isolated network interface and the sensitive network interface adapted to receive data packets from the isolated network interface and configured to:
 a. intercept every communication originating from the untrusted device; and
 b. for every intercepted communication:
  i. evaluate the communication to ascertain if the communication is an allowed transmission;
  ii. if the communication is an allowed transmission, generate a recreated communication using an allowed framework satisfying at least in part a purpose of the allowed transmission; and
  iii. transmit the recreated communication the over the sensitive network using the sensitive network interface, wherein the intercepted communication is not transmitted over the sensitive network.

15. The network sanitization device of claim 12, wherein the network sanitization device is a network edge enforcement device for creating an enforced edge of a sensitive network and limiting access to the sensitive network, and wherein
 e. the isolated network interface is an external access interface for connecting to an untrusted device outside of the sensitive network; and
 f. said processor is in communication with both the external access interface and the sensitive network interface and having a programmed protocol, the processor being configured for emulating the functionality of the untrusted device by generating safe communications using the programmed protocol, a set of trusted parameters, and data obtained from the untrusted device over the external access interface and transmitting the safe communications onto the sensitive network over the sensitive network interface.

16. The network sanitization device of claim 12, wherein the first and second visual indicia are adjacent to the first and second physical network connectors, respectively.

17. The network sanitization device of claim 16, wherein the first and second physical network connectors are comprised within respective first and second connector ports, at least one of the first and second connector ports comprising at least a portion of a respective one of the first and second visual indicia.

18. The network sanitization device of claim 12, wherein the rigid enclosed body comprises a first and second opposed portions each of which comprises respectively the first and second physical network connectors, wherein the first and second visual indicia are respectively located at the first and second opposed sides.

19. The network sanitization device of claim 18, wherein the first and second visual indicia cover all of the first and second opposed portions, respectively.

20. The network sanitization device of claim 19, wherein the first and second opposed sides are separated by a middle portion of the rigid enclosed body, the first and second indicia extending up to, but not over, the middle portion.

21. The network sanitization device of claim 12, wherein at least one of the first and second visual indicia comprises a coloration of a portion of the rigid body in a color indicative that the first physical network connector is for plugging untrusted equipment and the second physical network connector is for connecting to the sensitive network.

22. The network sanitization device of claim 12, wherein at least one of the first and second visual indicia comprise a pictogram on a portion of the rigid body indicative that the first physical network connector is for plugging untrusted equipment and the second physical network connector is for connecting to the sensitive network.

23. A network sanitization device for protecting a sensitive network from an untrusted dedicated-function device, the network sanitization device comprising:
   a. an isolated network interface for connecting to the untrusted dedicated-function device comprising:
      i. a first physical network connector for connecting to a first network cable in communication with the untrusted dedicated-function device;
      ii. a first data transfer circuit for transferring data to and from the first network cable; and
      iii. a power output circuit for injecting a power into the first network cable for powering the untrusted dedicated-function device;
   b. a sensitive network interface for connecting to the sensitive network comprising:
      i. a second physical network connector for connecting to a second network cable from the sensitive network;
      ii. a second data transfer circuit for transferring data to and from the second network cable; and
      iii. a power input circuit for extracting power from the second network cable for powering the network sanitization device;
   c. processing logic powered by the power extracted from the second network cable, the processing logic being in communication with the isolated network interface and the sensitive network interface, configured for implementing network sanitization to prevent unwanted communications from the untrusted dedicated-function device from harming the sensitive network; and
   d. a power distribution circuit for distributing power extracted from the second network cable by the power input circuit to the processing logic and to the power output circuit.

24. The network sanitization device of claim 23, wherein said processing logic is configured for enforcing a particular set of communications according to a safe protocol and safe parameters on the basis of the output of the untrusted equipment, wherein only the particular set of communication functions according to the safe protocol and the safe parameters enters the sensitive network from the network sanitization device.

25. The network sanitization device of claim 23, wherein the power output circuit comprises a passive PoE injector for applying a voltage to at least one wire pair that is unused by the first data transfer circuit to transfer data.

26. The network sanitization device of claim 23, wherein the power output circuit comprises an active PoE injector for applying a common-mode voltage to at least one wire pair used by the first data transfer circuit to transfer data, wherein the first data transfer circuit applies a differential voltage upon the at least one wire pair used by the first data transfer circuit.

27. The network sanitization device of claim 23, wherein the power input circuit comprises a passive PoE extractor for receiving a voltage across at least one wire pair that is unused by the second data transfer circuit and provides therefrom power to the power distribution circuit.

28. The network sanitization device of claim 23, wherein the power input circuit comprises an active PoE extractor for extracting a common-mode voltage from at least one wire pair used by the second data transfer circuit to transfer data.

* * * * *